INVENTOR.
RIGSBY C. SATTERFIELD, JR.

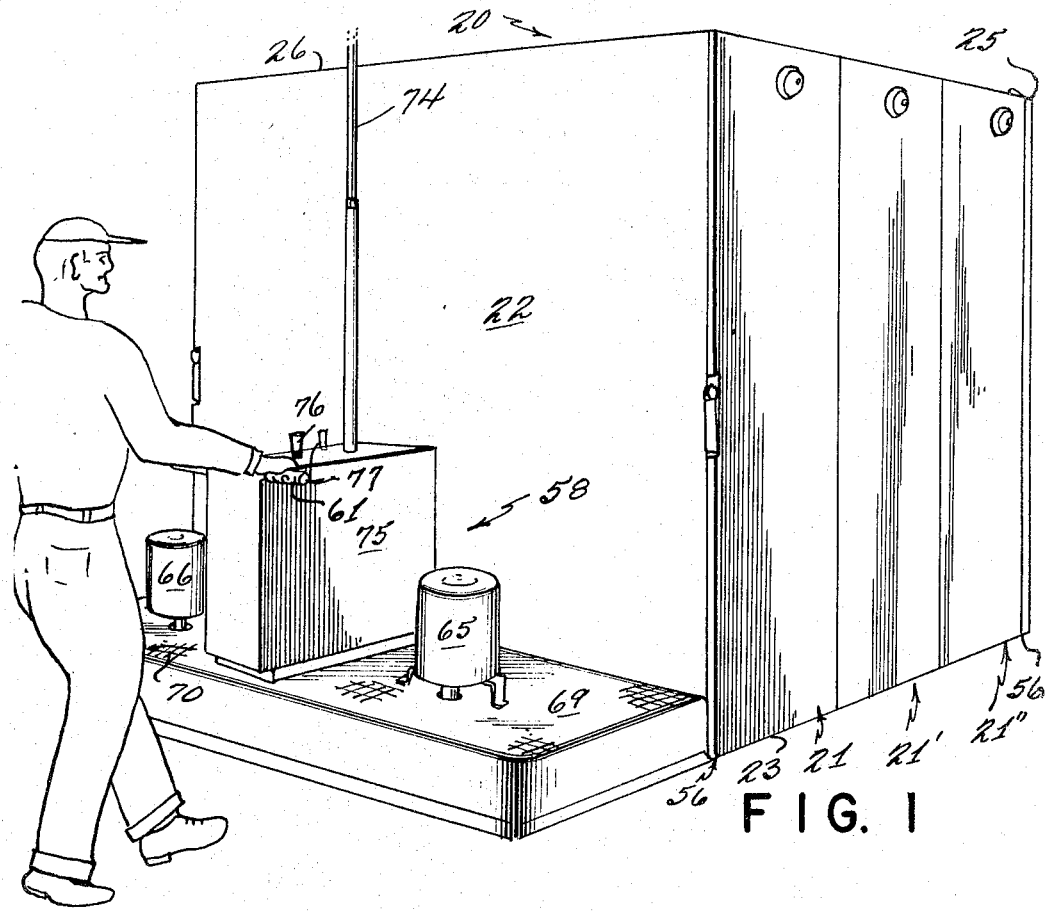
Nov. 1, 1966 — R. C. SATTERFIELD, JR — 3,282,359
APPARATUS SUPPORTED ON AIR CUSHIONS FOR HANDLING UNITIZED LOADS
Filed Dec. 15, 1961 — 5 Sheets-Sheet 1
INVENTOR.
RIGSBY C. SATTERFIELD, JR.
BY
Fisher, Christen & Goodson
ATTORNEYS

Nov. 1, 1966   R. C. SATTERFIELD, JR   3,282,359
APPARATUS SUPPORTED ON AIR CUSHIONS FOR HANDLING UNITIZED LOADS
Filed Dec. 15, 1961   5 Sheets-Sheet 4

INVENTOR.
RIGSBY C. SATTERFIELD, JR.
BY
Fisher, Christen & Goodson
ATTORNEYS

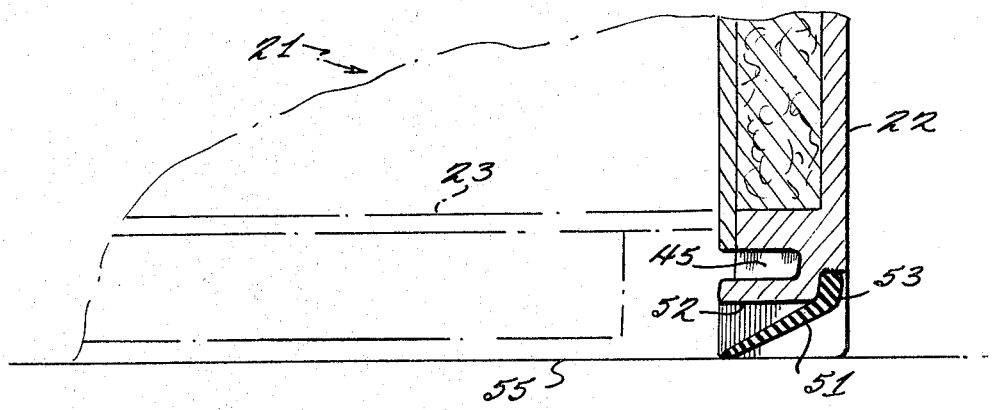
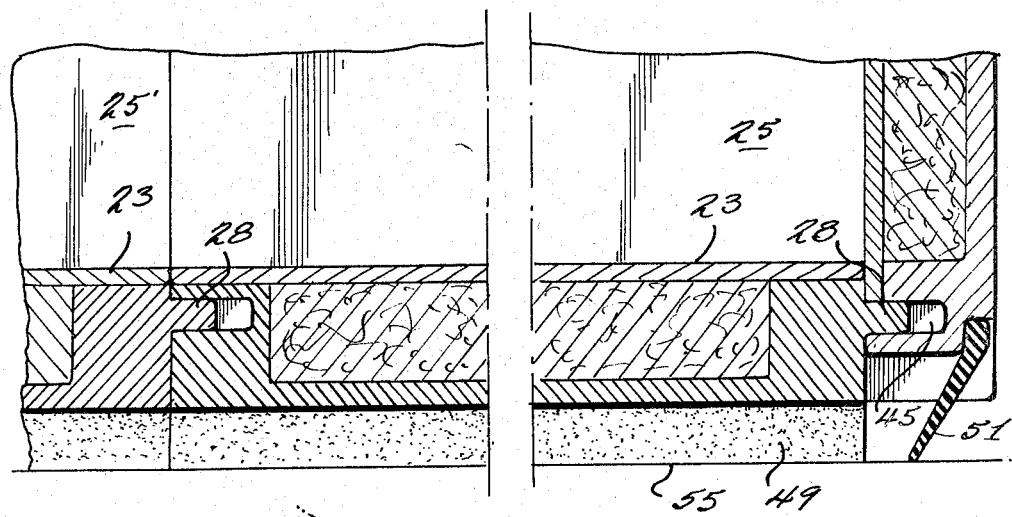
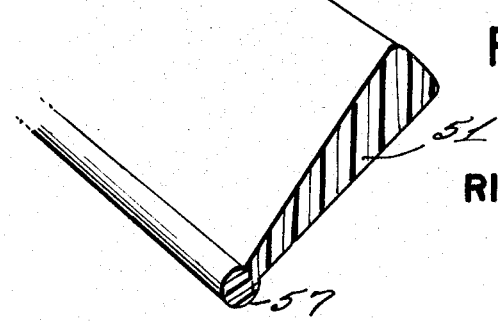

United States Patent Office 3,282,359
Patented Nov. 1, 1966

3,282,359
APPARATUS SUPPORTED ON AIR CUSHIONS FOR HANDLING UNITIZED LOADS
Rigsby C. Satterfield, Jr., 593 Waughtown St., Winston-Salem, N.C.
Filed Dec. 15, 1961, Ser. No. 159,725
7 Claims. (Cl. 180—7)

This invention relates to material handling, and more particularly to the shifting from place to place of cargo containers, pallets, portable load-supporting platforms, which are used in the transportation of goods by rail, truck, air or seagoing vessel.

One object of the invention is to provide means which reduce the energy required for moving a cargo handling device from place to place at a terminal or between a vehicle and a loading dock.

A feature of the invention is the provision of means to create an air cushion to lift a load-bearing device slightly above and out of physical contact with a supporting surface, the establishment of such an air cushion permitting the load to be shifted over the supporting surface with relatively little effort.

Another object of the invention is to provide an expandable cargo-carrying platform composed of a number of similar mating units which, when combined together, will be provided on its underside with means capable of forming a plenum chamber capable of supporting the load on an air cushion when supplied by an external source of air.

Other objects and advantages will be apparent to those skilled in the art after reading the following specification in connection with the annexed drawings, in which:

FIG. 1 is a perspective view of a preferred form of cargo-handling device in accordance with the present invention;

FIG. 2 is a plan view of one form of apparatus to supply an air blanket in accordance with this invention;

FIG. 9 is an enlarged detail of the lower margin of an end panel taken on line 9—9 of FIG. 5 when the cargo-handling apparatus is at rest;

FIG. 10 is similar to FIG. 9, but shows the apparatus in its raised position, and;

FIG. 11 is a perspective view of an enlarged scale of a modified form of sealing strip.

Figure 3:
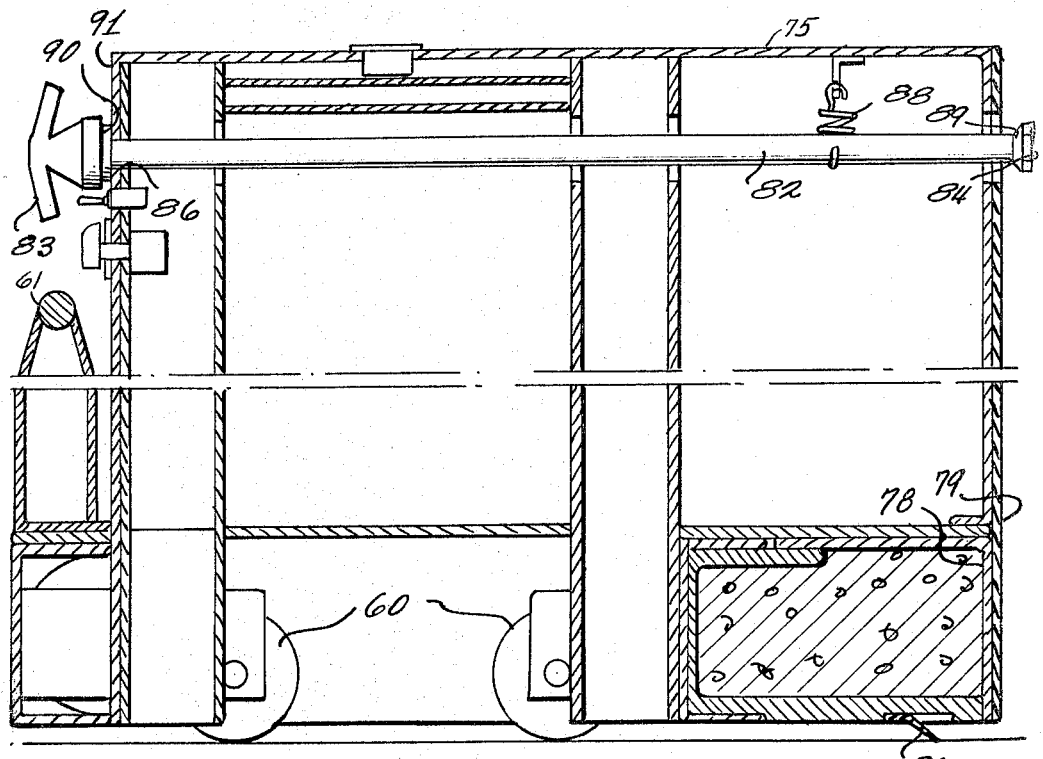
FIG. 3 is a vertical cross-section on an enlarged scale taken on the line 3—3 of FIG. 2.

Referring now to the drawings in detail, there is shown an expandable cargo container indicated generally by numeral 20, which is composed of one or more individual enclosure units 21, 21', etc. In the form shown, each of these units is substantially identical in construction and of relatively narrow length so as to be capable of mating interchangeably either with one or more other of these units to form a container of variable volume or with an end closure 22 to close the end of the container. Since all of the units 21, 21', etc., are identical, a description of one of them will be sufficient.

Unit 21 is rectangular in cross-section, comprising a floor 23, side walls 24 and 25, and a top wall 26. In order that each of the units may mate with another similar unit with a close fitting weather-proof sealing engagement, each of the marginal abutting edges of the units are constructed in a similar manner. In the case of unit 21, approximately one half of one abutting margin 27 of the top wall and a corresponding portion 28 of the floor together with the entire corresponding vertical margin 29 of the side wall, is provided with a projecting lip or flange, whereas the remaining half of the same margin 30 of the top wall, the corresponding margin 31 of the bottom wall, and the connecting vertical margin 32 of side wall 24 is longitudinally grooved. At the opposite edge of the unit 21, those portions of the top wall, side wall 25, and the bottom, respectively, which are in alignment with the flanges of the first edge, are, in this case, grooved. Similarly, those portions of the margin of the top wall, side wall 24, and the bottom, respectively, and corresponding to the grooved portions 30, 31 and 32, are themselves provided with flanges. It will thus be seen that regardless of the relative position of a unit 21 in making up a complete container 20, the marginally flanged portion of one unit will always mate with the grooved marginal portion of an adjacent abutting unit.

Each of the side walls 24 and 25 are provided at their opposite margins with manually operable latching means, adapted to cooperate with one another to fasten the units together or to cooperate with a keeper means 40, provided at each side of an end panel 22 to attach an end panel to any one of the units 21. In order that the end panels may mate with any one of the units 21 to form a weather-tight seal, each of these panels is provided with flanged marginal edges 41, 42 and 43, which mate with the corresponding grooved portions of a unit; the remaining marginal portions 44, 45 and 46 being grooved to receive the corresponding flanged portions of a unit.

It will thus be seen that the container 20 may comprise only a single unit 21 having end panels 22 closing it at each end, or that the volume of the container may be increased within practical limits by the substitution of one or more additional units 21'. This arrangement of interchangeable containers is disclosed and claimed in my co-pending application, Serial Number 166,445, filed December 20, 1961.

The present invention relates particularly to a method and means by which containers may be moved about on a relatively flat surface such as a loading dock, a roadway, the floor of a truck, railway car, airplane or seagoing vessel, or any other relatively flat surface including level ground and even a body of water, without requiring the use of mechanical supports such as wheels, castors, or the like. This is accomplished by the provision of means to produce a blanket of air between the underside of the container and the supporting surface and by providing means on the container such that a plenum chamber will be formed sufficient to cause the container to float on a cushion of air so that it may be moved in any direction over the supporting surface with very little effort.

Figure 7:
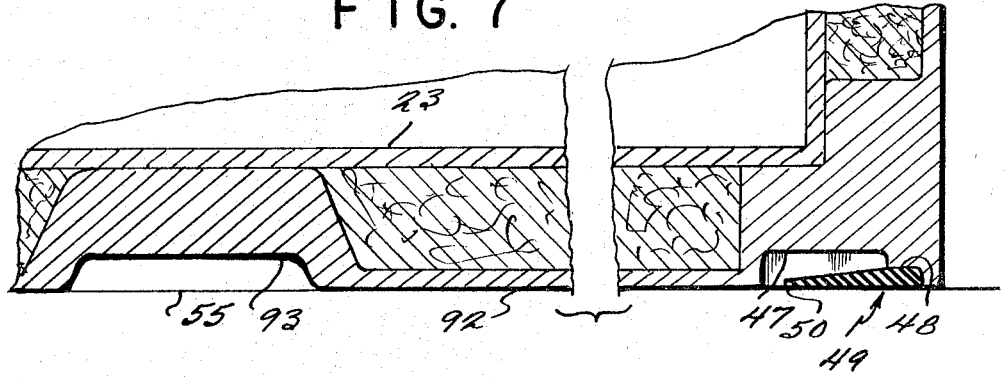
FIG. 7 is an enlarged detailed view taken on the line 7—7 of FIG. 6 when the device is resting on a supporting surface.
Figure 8:
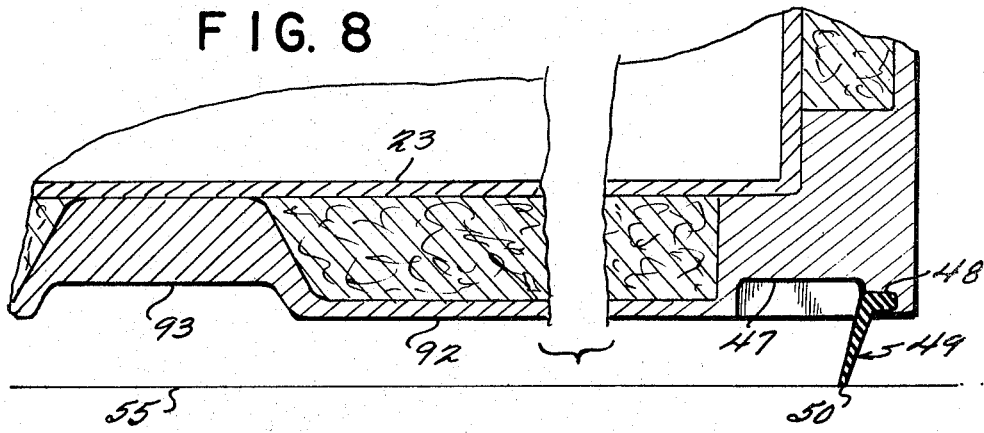
FIG. 8 is similar to FIG. 7 but shows the device in a raised position floating on an air cushion.

To accomplish this purpose, each of the units 21 is provided with a longitudinally running downwardly extensible curtain or air trap adjacent the lower edge thereof. One form in which this may be done is shown in FIGS. 7 and 8, wherein it will be seen that the floor 23 of a unit is provided on its underside with longitudinally running upwardly directed recesses 47 adjacent both side edges. The outer corners of each of these recesses is cut out or rabbeted at 48 to receive a normally horizontally extending strip 49 of flexible material such as rubber, neoprene, polyvinyl-chloride, or the like. The size of the rabbet 48 is such that one edge of the strip 49 may lie flush within, the strip being retained in place by means of a suitable adhesive or, if desired, by any other conventional means to make it replaceable as is well known in the art. The strip 49 may have a tapered cross-section as shown in the drawing and may, if desired, be molded so that the free edge 50, which extends only part way across the recess 47, may be placed under an initial bias when the container is resting on the floor such that when the container is first raised, the free edge will tend to move in a downward direction. Each of the strips 49 is co-extensive in length with the floor 23 of each unit so that when several of the units 21 are connected in mating engagement, the strips 49 of each unit will be placed in alignment with each other and in substantially abutting endwise engagement to form a nearly continuous curtain or barrier extending along the entire length of the container 20.

Each of the end panels 22 is provided along its lower edge with a strip of flexible material 51 which may be similar in construction to the flexible strips 49 on the units 21. The lower edge of the panel could be provided with a recess similar to the recess 47, but in the particular form of the container shown in the drawings, the bottom edge 52 is spaced slightly above the floor when in place so that the recess is not necessary. Similarly, the strip 51 could be secured in the same manner as in the case of the strip 49, but in the present form, for convenience, the lower exterior edge of the panel is shown as being rabbeted as at 53 and one side of the strip 51 may be adhesively secured within the rabbeted portion so that when the container is resting on a surface, the free edge of the strip will be folded under the bottom of the panel, as shown in FIGS. 9 and 10.

It will thus be seen that when one or more units 21 are mated with a pair of end panels 22 to form a closed container, any such container will have secured to its underside a peripherally extending downwardly extendible flexible curtain wall or air barrier composed of one or more aligned flexible strips 49 and flexible strips 51 at each end of the container. The advantage of such an arrangement is that if a sufficient volume of air be supplied between the bottom of the container and the supporting surface, the peripherally extending strips will form a plenum chamber to trap the air and support the container on an air cushion. If the volume of supplied air is sufficient to produce a unit pressure under the container, which is slightly greater than the unit pressure of the weight of the container, it will be evident that the container will be raised off from the supporting surface. At the same time, the strips 49 and 51 will bend downwardly so that their free edges 50 and 54 will, at all times, remain in substantial contact with the supporting surface 55.

This will be true even if the supporting surface is not entirely smooth and contains minor irregularities such as slight dips or rises, since the leading edge of the sealing strips 49 and 51 are sufficiently flexible to conform to these irregularities. Furthermore, a certain amount of leakage from the plenum chamber will occur in any event at each of the lower corners of the container, indicated at 56, due to the fact that there will be a gap between the longitudinally extending strips 49 and the transverse strips 51.

This leakage, however, may have the desirable effect of assisting the stability of the container in its elevated position, because if the air must escape entirely by passing under the free edges of the flexible strips, there would be a tendency to blow these strips outwardly resulting in the collapse of the plenum chamber thus created.

In this connection, it should be noted that experience has shown that the unit load per square inch of floor space of a container commonly used in the transportation of goods by rail and truck does not often exceed one pound. Therefore, while a large volume of air may be required to support a container on an air cushion, the pressure under which this volume of air is supplied will be in the neighborhood of only one pound per square inch. Therefore, only a relatively small force is directed against each of the curtain wall strips so that they need not be of excessively heavy construction. Since it is not intended that the container be suspended above the supporting surface at any greater height than is necessary to provide clearance, the result will be that the edges of the flexible strips will remain in contact with the surface. Consequently, it may be desirable to provide the free edge of the flexible strips with a longitudinally extending bead 57 of some friction-reducing flexible material such as Teflon, or other equivalent substance, as shown in FIG. 11.

While it is recognized that cargo-handling devices such as have now been described could be provided with self-contained means to supply the volume of air necessary to create the load-bearing air cushion beneath them, from a practical standpoint, there are inherent disadvantages in such an arrangement. Not the least of these disadvantages is the fact that the equipment would be heavy and bulky. In addition, would only come into use during the relatively short periods of time in transit that the load must be shifted from one position to another such as at a terminal or when transferring the load from a loading dock to a vehicle, and vice versa.

Figure 4:
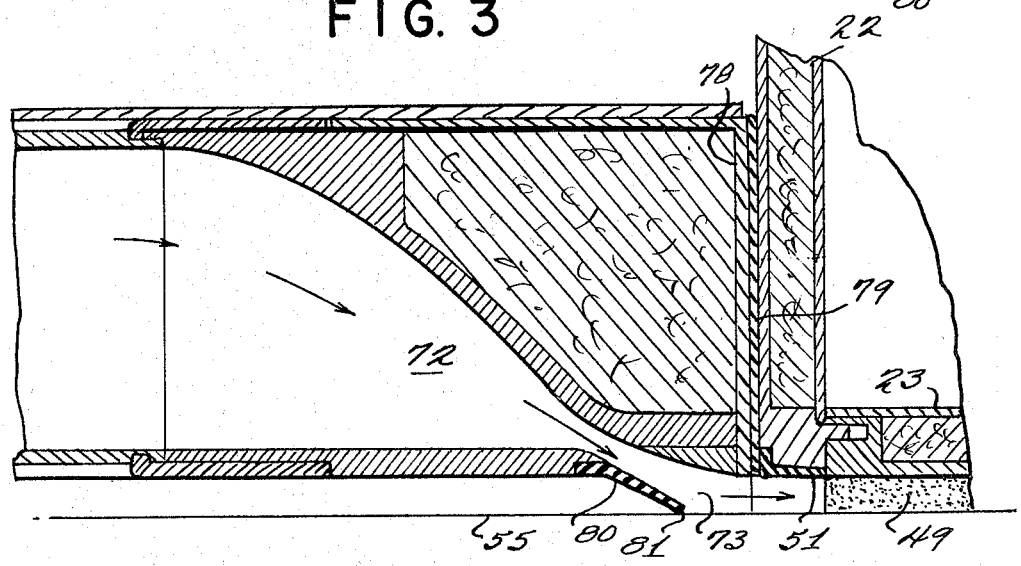
FIG. 4 is a vertical section through an air duct taken on the line 4—4 of FIG. 2.
Figure 5:
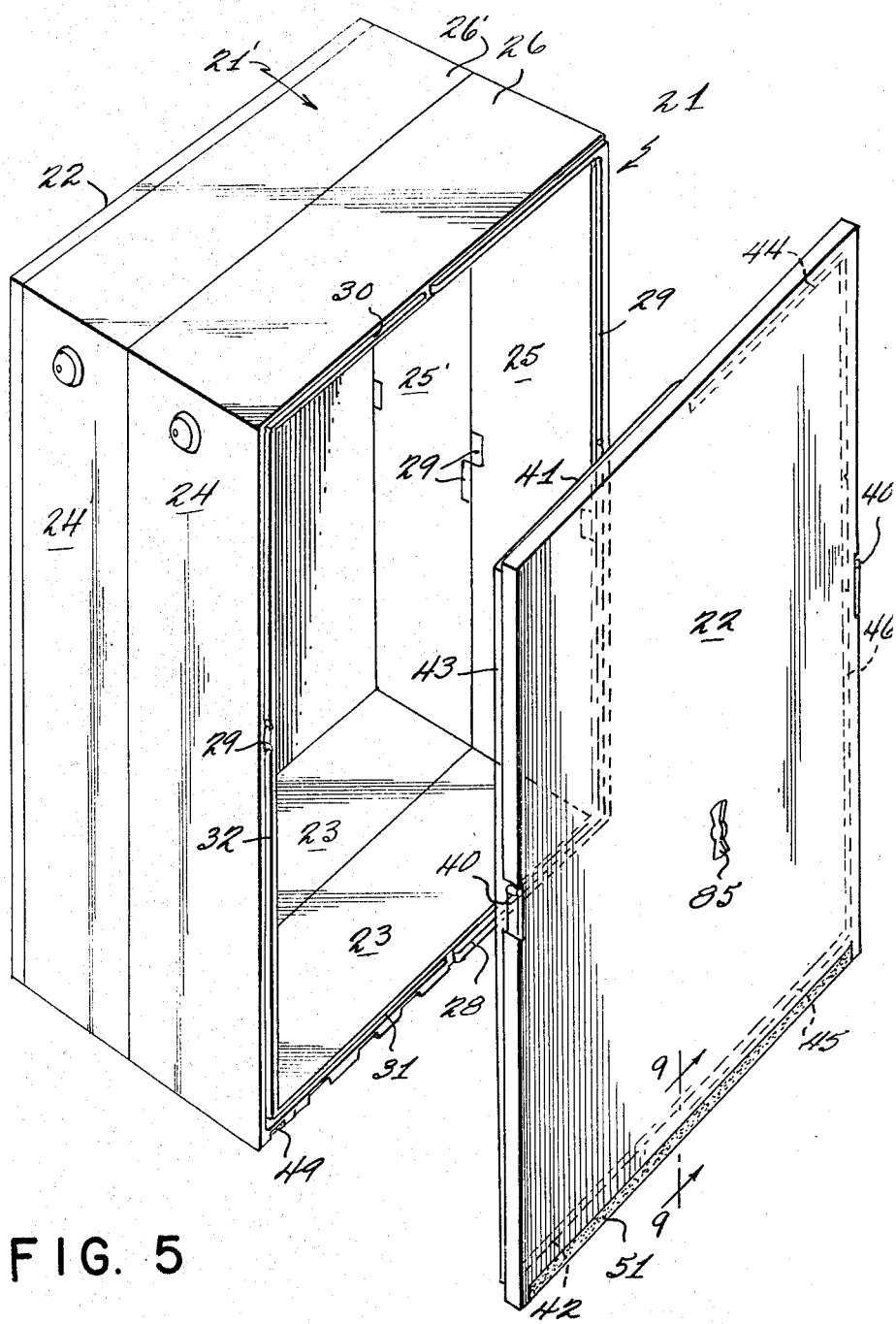
FIG. 5 is an exploded perspective view of two units of the cargo-handling apparatus.
Figure 6:
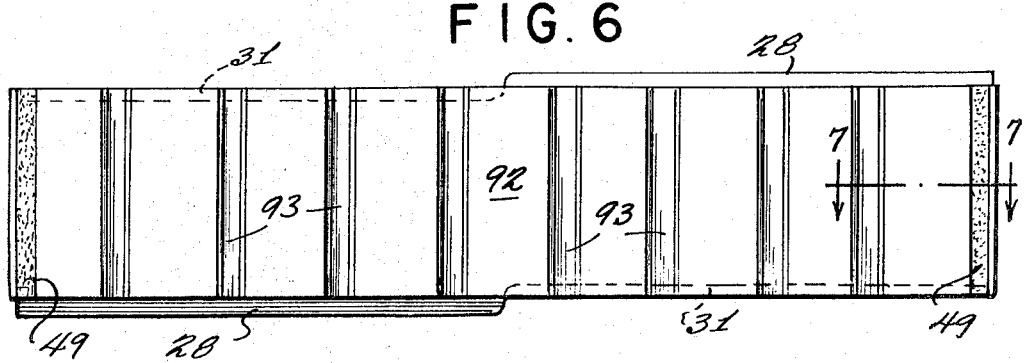
FIG. 6 is a bottom plan view of one of the units shown in FIG. 5.

Therefore, a feature of the present invention is the provision of means separate from the cargo-handling devices for supplying the air cushion necessary to float the cargo containers or platforms from one position to another on a supporting surface. With this arrangement, a single air supply means may be kept in fairly continuous service at a terminal facility for the purpose of shifting containers, thus obviating the necessity for carrying this separate equipment along with the cargo as a "dead" load. One embodiment of apparatus capable of supplying this air-blanket is shown in FIGS. 2, 3 and 4. In this instance, the air supply means, indicated generally by the numeral 58, comprises a generally rectangular frame 59 mounted on a set of castor wheels 60. A handle 61 enables an operator to move the entire assembly from place to place as desired.

A pair of centrifugal blowers 63 and 64, driven by electric motors 65 and 66, are mounted on the frame 59 with their respective inlet openings 67 and 68 covered by protective grills 69 and 70. The respective outlets 71 and 72 terminate in the form of a substantially continuous horizontally aligned narrow slot 73 arranged to direct a thin blanket of air in a downwardly and forwardly extending direction against the supporting surface 55 at the front end of the frame. It will be obvious that a single blower could be arranged to supply all of the necessary air or that more than two blowers could be used for this purpose. Electricity to supply the motors 65 and 66 can be supplied by a cable 74 connected to a central source (not shown). For convenience, a central pedestal 75 is mounted on the frame upon which there may be mounted control means 76 and 77 to enable the operator to start and stop and to regulate the speed of each of the motors 65 and 66. The particular system employed in connection with the control means 76 and 77 will, of course, depend upon the type of current available and the characteristics of the electric motors used. Systems of this type are well known in the art and form no part of this invention, and therefore, the electrical connections between the supply cable 74, the controls 76 and 77, and motors 65 and 66, are not shown. It will further be understood that it would be an obvious expedient, where electrical current is not available, to operate the blowers 63 and 64 by self-contained prime movers such as internal combustion engines.

For reasons which will be apparent later, the width of the slot 73 should be substantially equal to the width of an end closure panel 22, and extending upwardly from the slot along its entire length, there extends a vertical flat wall 78 across the front surface of which there is provided a resilient seal or pad 79. Positioned along the lower margin of the slot 73 is a flap or strip 80 of flexible material which when the blowers are operating will be urged in a downward direction so that its free edge 81 will be disposed in sealing engagement with the supporting surface 55 to prevent loss of air in a rearward direction.

Connecting means is also provided to join the air supply mechanism 58 with the container means which means includes, a rod 82 having a handle 83 at one end and a T-shaped element 84 at the other end adapted for detachable engagement with a circular recess having a T-shaped opening 85, provided on the exterior surface of each of the end panels 22. For convenience of operation, the rod 82 is mounted in a horizontal position near the top of the pedestal 75. The end of the rod adjacent the handle passes through a circular opening 86 at the operator's end of the pedestal; while the other end projects forwardly from the pedestal through a vertically extending slotted opening which permits a certain amount of vertical movement of the T-shaped element 84 with respect to the pedestal 75. Within the pedestal, there may be provided a centering means such as the vertically depending spring 88 designed to position the T-shaped element at a level such that it will readily engage with the connector opening 85 in an end panel when the container is resting on the surface. The rearward portion 89 of the connector element may have a conical configuration so as to provide a form of ball-type connection with the connector opening 85. Axial thrust exerted on the rod 82 when the connector element 84 is engaged with the connector opening will be transmitted by the radially extending flanged portion 90 of the handle to the vertical wall 91 of the pedestal.

In operation, when it is desired to move the container 20, the air supply means 58 will be moved into position to place the pad 79 against one of the end closure panels 22, and is locked in position by means of the connector 84. The operator then turns on the power, by means of controls 76 and 77 to one or both of the motors 65, 66, to project a forwardly directed thin blanket of air through the nozzle means 73 towards the lower edge of the end panel 22. This blast of air will deflect the downwardly extending strip 51 inwardly allowing the air to gradually infiltrate between the supporting surface 55 and the underside 92 of the unit 21. Any tendency for the air to blow by in a backward direction will be substantially prevented by the downwardly extending strip 80 placed below the nozzle means. Similarly, the resilient pad 79 will prevent any large amount of leakage of air upwardly between the end panel and the air supply means. Experiments have shown that air directed in this manner underneath a load-supporting member having a flat surface over its entire surface over its entire underside will penetrate between that surface and a supporting flat surface, but to ensure a more rapid distribution of air along the length of the container, a series of longitudinally extending channels 93 may be provided in the underside of each unit 21. When the blanket of air flows outwardly towards the sides of the container, it will come into contact with the inner edges 50 of the strips 49, and at the same time, will expand upwardly into the longitudinally extending recesses 47. As the volume of air beneath the container increases, the entire container will rise from the supporting surface and at the same time, the pressure of air in the recesses 47 will urge the strips 49 downwardly to maintain the free edges 50 in contact with the supporting surface. Thus supported in the raised position, the only frictional contact between the container and the supporting surface is that caused by sliding contact of the downwardly extending strips. This contact is relatively slight but will resist uncontrolled shifting of the container. It should be noted, however, that as the container rises, the exterior surface of the end panel 22 will also be elevated in sliding contact with the cushioning pad 79 of the air supply means since the air supply is at all times supported by the castor means 60. The relative vertical movement of the container with respect to the air supply does not affect the connection between the two because the slotted opening permits the forward end of the rod 82 to move vertically while engaged in the recess 85.

It will be evident that in the present embodiment of the invention, the container, when in its raised position, must be shifted manually, but it will be evident that the air supply means could be provided with self-contained propelling means under the control of the operator for the purpose of shifting the containers while resting on its air cushion. Furthermore, it will be evident that if at any time it is necessary to stop a shifting motion of the container quickly, all that need be done is to shut off the blower means to reduce or cut off the supply of air which will immediately cause the container to drop back into physical engagement with the supporting surface. It will also be evident that other arrangements for supplying the air to the plenum chamber provided by the strips 49 and 51 could be employed and that the air could be introduced at any point along the lower margin. It should also be evident that the present invention is not limited to sectionalized enclosed containers but may be modified by one skilled in the art for use with other load-bearing structures such as a pallet, or open-topped containers. Such modified forms of the invention and other variations coming within the knowledge of one skilled in the art would be included within the scope of the annexed claims.

I claim:
1. In cargo handling apparatus, the combination including, load-bearing structure means having a horizontal flat bottom wall provided with a plurality of peripherally arranged downwardly projecting flexible flap means, said flap means having horizontally extending flexible free edges to frictionally engage with a substantially flat supporting surface to form an air chamber below the bottom wall, and blower means having horizontally elongated nozzle means to supply air to said chamber, said nozzle means being co-extensive in length with one of said flap means to supply air to the air chamber below said flap means and being provided with sealing means operatively engageable with the exterior of said load-bearing structure above the flap means and also with said supporting surface to minimize air leakage.

2. In load-bearing structures having a horizontal floor, the underside of said floor being substantially flat so as to distribute the load over substantially the entire area of a flat surface upon which the floor rests, elongated flexible strip means disposed normally in a horizontal plane extending along a marginal portion of the underside of said floor, said strip being recessed within the floor to lie flush with the underside thereof, the outer edge of said strip being secured to the floor, the inner edge of the strip being free to be downwardly urged by a stream of outwardly flowing air between the floor and supporting surface, the underside of said floor being provided with a peripheral channel above said recessed strip, said channel being in communication with the space below said floor.

3. In expandable loading structures, the combination including a plurality of rectangular platform means having side margins and end margins, said platform means having uniform width and including means for separable interchangeable engagement in end-to-end abutting alignment to provide a load-supporting structure of uniform width but variable length, each of said platform means including downwardly extending air-entrapping flap means disposed adjacent to and coextensive with each of the side margins, a pair of end member means, means to separably engage the end member means with the exposed end margins of the respective endmost platform means, said end member means including downwardly extending flexible air-entrapping flap means coacting with the flap means of the side margins to provide a substantially continuous plenum chamber beneath said plurality of platform means, and means for supplying air to said plenum chamber including portable air supply means having nozzle means separably engageable with one of said platform means for providing a load supporting air cushion under all of said plurality of platform means.

4. The invention as defined in claim 3, wherein said nozzle means is positioned horizontally exteriorly of one of the end margins of said platform means and in abutting relation thereto for supplying air past the adjacent flap means into said plenum chamber, and air-entrapping horizontally extending flexible seal means for engagement with a supporting surface behind said nozzle means coextensive with said flap means.

5. The invention as defined in claim 3, wherein each of said platform means also includes a pair of vertically upwardly extending side wall means coextensive with said side margins and interchangeably separably engageable in aligned abutting relation with the side wall means of the adjacent platform means.

6. The invention as defined in claim 5, wherein each of said end member means includes a vertically upwardly extending panel means coextensive with said end margin, said panel means being disposed in separable transvere abutting engagement with the side wall means of the respective endmost platform means.

7. The invention as defined in claim 6, wherein each of said platform means includes transverse top wall means extending between said side wall means and coextensive in length therewith.

References Cited by the Examiner

UNITED STATES PATENTS

| | | |
|---|---|---|
| 936,395 | 10/1909 | Worthington. |
| 2,918,183 | 12/1959 | Petersen et al. _____ 180—7 X |
| 3,027,860 | 4/1962 | Priest _____ 180—7 X |
| 3,052,483 | 9/1962 | Petersen _____ 180—7 |
| 3,055,446 | 9/1962 | Vaughen _____ 180—7 |
| 3,094,223 | 6/1963 | Smith _____ 180—7 X |
| 3,096,728 | 7/1963 | Amann et al. _____ 180—7 X |
| 3,106,260 | 10/1963 | Bollum _____ 180—7 |
| 3,124,209 | 3/1964 | Flipse _____ 180—7 X |
| 3,150,732 | 9/1964 | Walker _____ 180—7 |
| 3,172,494 | 3/1965 | Cockerell _____ 180—7 |
| 3,181,636 | 5/1965 | Cockerell _____ 180—7 |
| 3,182,739 | 5/1965 | Cockerell _____ 180—7 |
| 3,183,988 | 5/1965 | Jones _____ 180—7 |
| 3,191,705 | 6/1965 | Jones et al. _____ 180—7 |
| 3,209,929 | 10/1965 | Petersen et al. _____ 180—7 X |

OTHER REFERENCES

Publication: "Design News"; May 23, 1960; pages 6 and 7.

A. HARRY LEVY, *Primary Examiner.*